MEMORY APPARATUS EMPLOYING A PLURALITY OF DIGIT REGISTERS

Filed Oct. 19, 1964

INVENTOR
JOSEPH P. SHUBA
BY C. A. Gulbrandsen
ATTY.

3,413,618
MEMORY APPARATUS EMPLOYING A PLURALITY OF DIGIT REGISTERS

Joseph P. Shuba, Joliet, Ill., assignor to Automatic Electric Laboratories, Inc., Northlake, Ill., a corporation of Delaware Filed Oct. 19, 1964, Ser. No. 404,765
9 Claims. (Cl. 340—174)

ABSTRACT OF THE DISCLOSURE

A recirculating memory system employs a distributor for simultaneously energizing a reading winding of one word and a writing winding of the previously read word. In one embodiment each of two registers is alternately operated as an input and an output register. A second embodiment utilizes two registers in tandem to receive and re-enter data.

This invention relates to memory systems and in particular to apparatus for decreasing the read-write cycle time of a memory system.

Systems which require a substantially continuous check of data indicating its operating condition, or a portion thereof, often include a memory which keeps track of these operating conditions. For example, time sharing communication systems may employ such a memory to examine the condition of its various links. To accomplish reading from a memory for this type of an application a sequential scan of the memory may be employed which repetitively provides an orderly and complete check of existing link conditions. A well known method of scanning the links (row of a memory) is to read out a word from a row, examine the word and then rewrite the word into the memory. This takes time and therefore each time position (time slot) of the scanning distributor must be sufficiently long, or more than one time period must be utilized, to encompass the three just-mentioned functions.

The present invention provides a memory that is similar in overall function to the just-described; however, the present invention can accomplish the above three functions in substantially one half the time required by the above techniques. Briefly, the present invention employs the scan technique of reading from a memory. One row (word) of the memory is read during a time position and the following row in sequence is read during the following time position. During each time position the previously read data is reinserted into the memory. That is, one row is being read and another rewritten during the same time position.

The object of the invention is to provide a memory system including a memory which is adapted to be accessed for reading and writing at a fast rate.

A feature of the invention resides in the utilization of two digit registers for registering data and then reinserting data into the memory.

Another feature of the invention resides in the use of a word distributor for allowing storage of the information read alternately between two digit registers.

Another feature of the invention resides in the use of two word solenoids per word. One solenoid is for reading and the other is for writing. Included in this aspect of the invention is the connection of a read solenoid of one word to the write solenoid of another word so that the reading field of one word has a counterpart writing field in another word.

These and other objects and features of the invention will become apparent and the invention will be best understood from the following description and reference to the accompanying drawings.

Figures 1, 2:
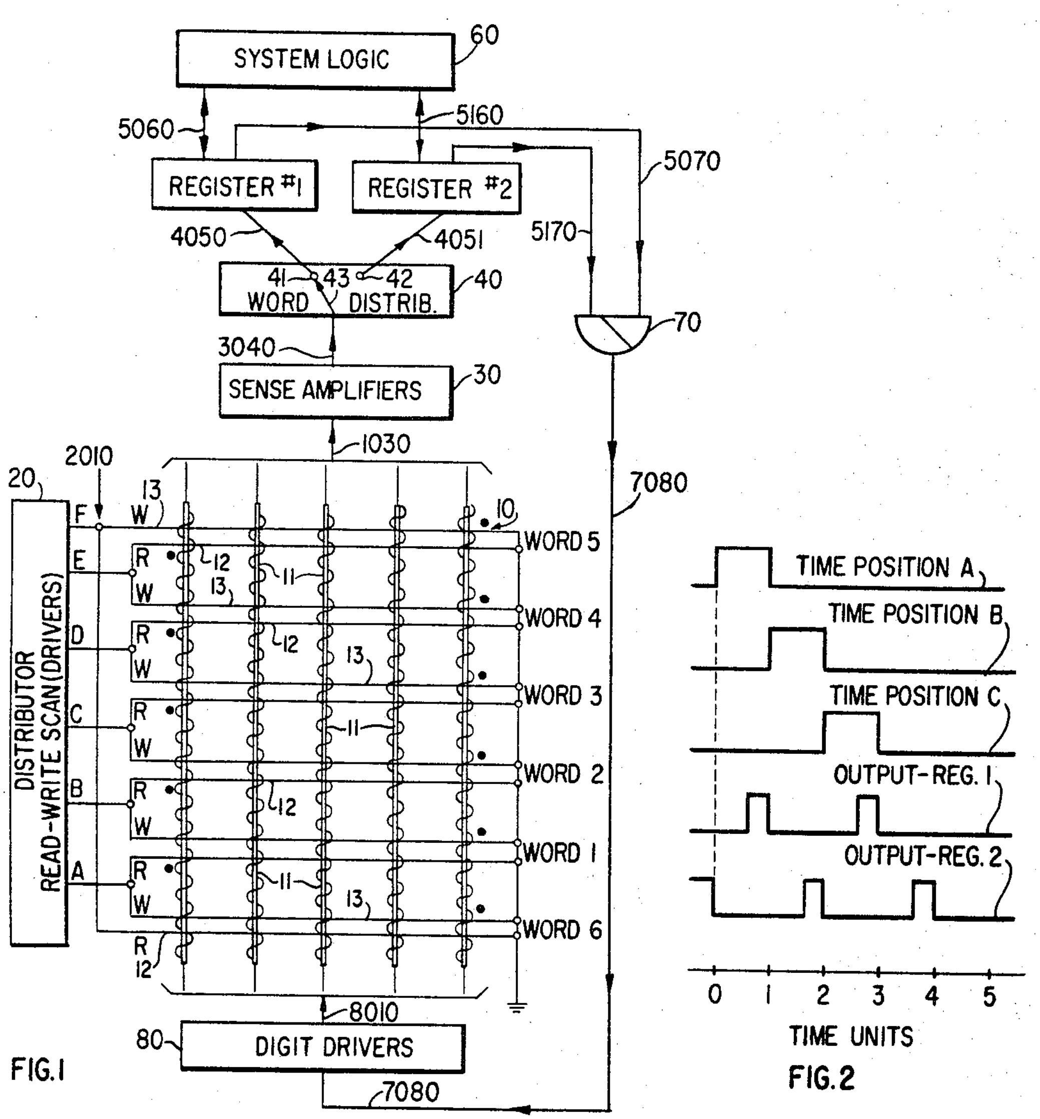
FIG. 1 is a schematic representation of an embodiment of the invention.
FIG. 2 is a timing diagram for FIG. 1.

Referring to FIG. 1, the invention employs a memory 10 comprising wire magnetic storage devices 11. It should be noted that other magnetic devices, such as ferrite cores, can also be used in the memory 10. Spaced apart along the storage devices are read solenoids 12 (denoted also by the letter R and the left-hand polarity dot) and write solenoids 13 (denoted by the letter W and the right-hand polarity dot). The solenoids 12, 13 are only schematically shown and would seem to obtain the same drive current from the distributor 20; however, the write solenoids are actually half-write solenoids as are well known in coincident current schemes and do not, when energized, supply sufficient magnetic field intensities to switch the bit locations which are at the intersections of the solenoids and the storage devices. As a simple example, the read solenoids could have two turns and the write solenoids only one turn. The distribution sequence is from bottom to top in the drawings as indicated by reference characters A–F. Each read solenoid is electrically connected to the write solenoid of the next preceding memory row or word. For convenience and brevity, the solenoids 12, 13 are terminated at ground. Connected to the output sense conductors of the memory 10 is a set of sense amplifiers 30 which may be of many known configurations. Connected to the sense amplifiers is a word distributor 40 which can, by way of example, comprise two sets of AND gates, shown schematically as contacts 41, 42, and a flip-flop shown schematically as armature 43. Digit registers 50, 51 which comprise bistable devices, say multivibrators, are connected to the word distributor and are examined as to data content by the system logic 60. The logic 60 can instruct a resetting of the registers 50, 51 to alter the information concerning the conditions of the links. This however does not form a part of the present invention which deals only with the cycle of reading and writing. New information due to intervention of the logic will become an "old" word after one cycle of the distributor 20. Connected to other outputs of the registers is a logic circuit, simplified herein to an OR gate 70. A set of digit (half write) drivers 80, the other portion of the half-write scheme, is interposed between the logic 70 and the sense wires of the memory 10. The sense conductors also serve as half-write conductors.

FIG. 2 is almost self-explanatory and will be dealt with in the operational description below.

Figure 3:
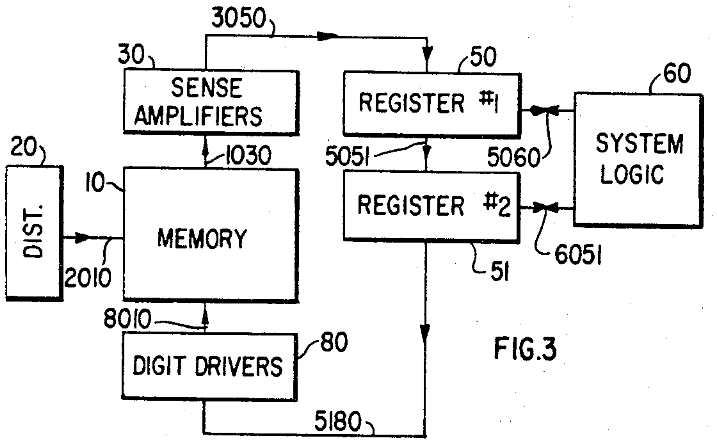
FIG. 3 is a schematic diagram of another embodiment of the invention.

FIG. 3 describes an embodiment of the invention wherein the word distributor 40 and the logic 70 FIG. 1 are not employed. Additionally, the modification of FIG. 3 requires control signals, other than information changing signals, be sent from the system logic to the registers. As in FIG. 1, the arrangement of FIG. 3 employs a distributor 20 for accessing a memory 10. Drivers 80 and sense amplifiers 30 also are as described in FIG. 1. Connected in tandem between the sense amplifiers and the drivers are digit registers 50, 51. The system logic examines the data content of register 50 and controls registers 50, 51 as will be described below.

The access signals and data signals will traverse paths, which are of course electrical couplings. These paths are functionally referenced in the drawings. For example, path 4051 extends between the word distributor 40 and register 51. Likewise, path 5070 extends between register 50 and the logic 70.

Turning to FIG. 1, the distributor 20, including driver apparatus, assigns a time position to each read solenoid 12 and each write solenoid 13. It should be noted at this point that distributors 40 and 20 are in phase; the difference being that distributor 20 has a count of two and distributor 40 has a count equal to the number of words, six in this example. Assume that time position B is in progress. Solenoid 12 of word 2 and solenoid 13 of word 1 are energized to provide a read field and a half-write field, respectively. Word 2 is read from the memory 10 over path 1030 and amplified by elements 30. Assuming armature 43 is closed to contact 41 the amplified word 2 is registered in register 50 via path 3040, armature 43, contact 41 and path 4050. The system logic 60 may now examine word 2 over path 5060.

During the next time position C, word 3 is read in a similar manner and registered in register 51 via path 1030, sense amplifiers 30, path 3040, armature 43, contact 42 and path 4051. Solenoid 13 of word 2 is also energized and register 50 is operated during the last portion of time position C, and via path 5070, logic 70 and path 7080, instructs the digit drivers 80 transmit digit currents to the memory via path 8010 in accordance with the data content of register 50. Word 3 has now been registered and word 2 has been read, examined, and rewritten into the row from which it was extracted. Word 4 will be read and word 3 rewritten in time position D, and so on, sequentially through the memory, repeating the scan, in this example, every sixth time position.

Keeping the above in mind and turning to FIG. 2, it can be seen that each register operates to unload its data after about 70% of a time position and for the remaining period of approximately 30% of the time position. It will also be noted that registers 50, 51 alternate in operation. It is possible that each register could inherently have the 70% delay; however, paths 4050, 4051 or 5060, 5160 can supply clock pulses to control the release of information. As an example of the many possibilities available, a flip-flop, such as element 43, can be adapted to control the release of information from the registers. A similar arrangement can be supplied in logic 60 to control information transfer between and information output from registers 50, 51 in FIG. 3.

FIG. 3 describes an embodiment of the invention in which the word distributor 40 and the logic 70 of FIG. 1 are not required. As can be seen in FIG. 3, the relationships between the memory 10, distributor 20, sense amplifiers 30 and the digit drivers 80 remain unchanged. Therefore, the reading and writing of the memory 10 is the same. Following the passage of a data word from the sense amplifiers 30, it can be seen that the word is passed via path 3050 to register 50. The system logic examines this data via path 5060 and, via path 5060, causes register 50 to transfer the word to register 51 via path 5051. Register 51 is controlled via path 6051 to release its previous content to digit drivers 80 via path 5180 and accept the data word from register 50 via path 5051.

The description of my invention has been by way of example for purpose of illustration only. Many changes and modifications thereof may be made by one skilled in the art without departing from the spirit and scope of the invention and should be included in the appended claims.

What is claimed is:

1. A memory system comprising: a memory matrix including first and second pluralities of access inputs and a plurality of information outputs; first distributor means connected to said first plurality of access inputs for supplying full read access and half-write access to said matrix; first and second register means; second distributor means interposed between said plurality of information outputs and said two register means for supplying output information alternately to said two register means; and means interposed between said two register means and said second plurality of access inputs for supplying half-write access to said matrix in coincidence with the half-write access of said first distributor means and under the alternate control of said two register means.

2. A memory system comprising: a plurality of data storage means arranged in columns and rows, each said row storing a data word; a plurality of first solenoids each inductively coupled to a separate row of said storage means; a plurality of second solenoids each inductively coupled to a separate row of said storage means and in an opposite sense of magnetic polarity, each said second solenoid further being connected to a said first solenoid of an adjacent row of said storage means; a plurality of sense conductors each inductively coupled to a separate column of said storage means; distributor means for sequentially energizing said first and second solenoids to respectively read data from and write data into said storage means; means connected to said plurality of sense conductors for amplifying the data read; word distributor means connected to said amplifying means for controlling registration of said data; first and second register means each connected to and controlled by said word distributor means so that each said register means stores alternately read data words; and means connected to said plurality of sense conductors and connected to and alternately controlled by said two register means for energizing said plurality of sense conductors in coincidence with the energization of the next sequentially energized second solenoid to rewrite the same data into the row from which it was read.

3. A memory system comprising: a plurality of data storage means ararnged in columns and rows, each said row storing a data word; a plurality of first solenoids each inductively coupled to a separate row of said storage means; a plurality of second solenoids each inductively coupled to a separate row of said storage means and in an opposite sense of magnetic polarity, each said second solenoid further being connected to a said first solenoid of an adjacent row of said storage means; a plurality of sense conductors each inductively coupled to a separate column of said storage means; distributor means for sequentially energizing said first and second solenoids to respectively read data from and write data into said storage means; means connected to said plurality of sense conductors for amplifying the data read; first means connected to said amplifier means for registering data; second means connected to said first register means for receiving data from said first register means; and means interposed between said second register means and said plurality of sense conductors, and controlled by said second register means in accordance with the data content thereof to energize said plurality of sense conductors in coincidence with the energization of the next sequentially energized second solenoid to rewrite the same data into the row from which it was read.

4. A sequentially scanned memory system comprising. a plurality of data storage elements arranged in columns and rows; a plurality of sense conductors each coupled to separate columns of storage elements; a plurality of read conductors each coupled to separate rows of storage elements; a plurality of write conductors each coupled to separate rows of storage elements; means for sequentially energizing said read and write conductors, a read conductor being simultaneously energized with the write conductor of the row just previously read; amplifier means connected to said sense conductors; first and second register means connected to said sense conductors and alternately operated to store data and energize said sense conductors in coincidence with the energization of a write conductor according to the data content therein; and register control means interposed between said amplifier means and said registers for alternately distributing data between said two registers.

5. The memory system according to claim 4 wherein each read conductor is inductively coupled to a separate row of storage elements and wherein each write conductor is inductively coupled to a separate row of storage elements in a signal transfer relationship that is opposite to that of said read conductors.

6. A sequentially scanned memory system comprising: a plurality of data storage elements arranged in columns and rows; a plurality of sense conductors each coupled to a separate column of said storage elements; a plurality of read conductors each coupled to a separate row of said storage elements; a plurality of write conductors each coupled to a separate row of said storage elements; means for sequentially energizing said plurality of read conductors and said plurality of write conductors, a read conductor and the write conductor of the row just-previously read being simultaneously energized; and first and second interconnected registers connected to said sense conductors, said first register being operated to store the data read, said second register being operated to restore the data read by energizing said sense conductors in coincidence with the energization of a write conductor according to the data just-previously read.

7. The memory system according to claim 6 wherein each read conductor is inductively coupled to a separate row of storage elements and wherein each write conductor is inductively coupled to a separate row of storage elements in a signal transfer relationship that is opposite to that of said read conductors.

8. In a memory system including a memory matrix including rows and columns of memory elements, a sense conductor for each column, a read conductor and a write conductor for each row, a distributor for energizing said read conductors during separate sequential time positions for reading from said rows, an amplifier connected to each sense conductor, and means for registering data and rewriting data into the row from which it is read, said means comprising:

(a) a plurality of electrical connections, each said electrical connection extending between a write conductor and the read conductor of the next row in sequence for simultaneous energization of said two conductors by said distributor;

(b) first and second registers each being alternately operated to store data during a time position and to energize said sense conductors during the following time position; and (c) means interposed between said amplifier means and said two registers for distributing data alternately to said two registers.

9. In a memory system including a memory matrix including rows and columns of memory elements, a sense conductor for each column, a read conductor and a write conductor for each row, a distributor for energizing said read conductors during separate sequential time positions for sequentially reading from said rows, an amplifier connected to each sense conductor, and means for registering data and rewriting data into the row from which it is read, said means comprising:

(a) a pluralty of electrical connections, each said connection extending between a write conductor and the read conductor of the next row in sequence for simultaneous energization of said two conductors by said distributor;

(b) a first register connected to said amplifiers and operated during each time position to register the data read; and (c) a second register interposed between said first register and said sense conductors, operated to rewrite the data read by energizing said sense conductors in accordance with its data content during the next sequential time position.

References Cited

UNITED STATES PATENTS

| | | | |
|---|---|---|---|
| 2,802,203 | 8/1957 | Stuart-Williams ---- | 340—66 X |
| 3,045,213 | 7/1962 | Zschekel ---------- | 340—172.5 |
| 3,054,988 | 9/1962 | Edwards et al. ---- | 340—166 X |

BERNARD KONICK, *Primary Examiner.*

J. F. BREIMAYER, *Assistant Examiner.*